Dec. 21, 1948.    J. G. PATTON    2,456,730
MILLING MACHINE ATTACHMENT
Filed Aug. 6, 1945    5 Sheets-Sheet 1

Inventor:
James G. Patton
By Fred Gerlach
Atty.

Dec. 21, 1948. J. G. PATTON 2,456,730
MILLING MACHINE ATTACHMENT
Filed Aug. 6, 1945 5 Sheets-Sheet 2
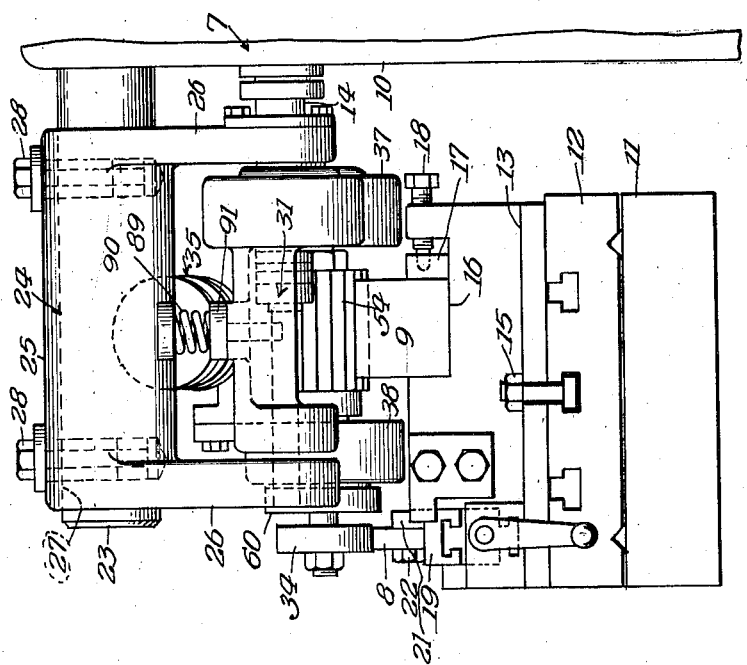
Inventor:
James G. Patton
By: Fred Gerlach
atty Dec. 21, 1948.   J. G. PATTON   2,456,730
MILLING MACHINE ATTACHMENT
Filed Aug. 6, 1945   5 Sheets-Sheet 3

Inventor
James G. Patton
By: Fred Gerlach, Atty.

Dec. 21, 1948.   J. G. PATTON   2,456,730
MILLING MACHINE ATTACHMENT

Filed Aug. 6, 1945   5 Sheets-Sheet 4

Inventor:
James G. Patton
By: Fred Gerlach, Atty.

Dec. 21, 1948.  J. G. PATTON  2,456,730
MILLING MACHINE ATTACHMENT
Filed Aug. 6, 1945  5 Sheets-Sheet 5

Inventor:
James G. Patton
By: Fred Gerlach
atty.

Patented Dec. 21, 1948

2,456,730

UNITED STATES PATENT OFFICE 2,456,730

MILLING MACHINE ATTACHMENT

James G. Patton, Fort Worth, Tex., assignor to Consolidated Vultee Aircraft Corporation, San Diego, Calif., a corporation of Delaware Application August 6, 1945, Serial No. 609,279

8 Claims. (Cl. 90—13.2)

The present invention relates generally to attachments for milling machines. More particularly the invention relates to that type of attachment which is adapted for use in connection with a conventional or standard milling machine having a horizontally slidably, power fed, fixture-equipped bed plate and a horizontal power driven arbor over the bed, and comprises an auxiliary cutter carrying arbor which is arranged in parallel relation with the main arbor and is connected for drive by the latter.

One object of the invention is to provide a milling machine attachment of this type which is an improvement upon, and has certain inherent advantages over, previously designed attachments and is characterized by the fact that it operates in conjunction with a contour guide plate on the fixture of the machine to mill a work piece on the fixture to a contour corresponding to that of the guide plate.

Another object of the invention is to provide a milling machine attachment of the last mentioned character in which the auxiliary cutter carrying arbor embodies at one end thereof a roller for engagement with the upper surface of the contour guide plate on the fixture of the machine and is rotatably mounted on a frame which is pivoted to swing vertically in order that the roller, together with the arbor, is free in connection with feed of the bed plate to follow the contour of the upper surface of the guide plate.

Another object of the invention is to provide a milling machine attachment of the type and character last mentioned in which the frame for supporting the auxiliary roller-equipped arbor for vertically swinging movement is pivoted about the axis of the main arbor of the machine and is so constructed and designed that it serves to encase or cover the upper portion of the cutter on the auxiliary arbor.

A further object of the invention is to provide a milling machine attachment of the type and character under consideration in which the auxiliary arbor is positively driven from the main arbor of the machine by a gear train, and the vertically swinging frame is provided with yieldable means whereby the distal portion thereof is urged downwards in order to cause the roller on the auxiliary arbor to bear against and follow the upper surface of the contour guide plate in connection with the use of the attachment.

A still further object of the invention is to provide a milling machine attachment which is generally of new and improved construction, effectively and efficiently fulfills its intended purpose, and is characterized by the fact that it may be produced at a comparatively low cost.

Other objects of the invention and the various advantages and characteristics of the present milling machine attachment will be apparent from a consideration of the following detailed description.

The invention consists in the several novel features which are hereinafter set forth and are more particularly defined by the claims at the conclusion hereof.

In the drawings which accompany and form a part of this disclosure or specification and in which like numerals of reference denote corresponding parts throughout the several views:

Figure 1 is a fragmentary perspective view of a conventional or standard milling machine having applied thereto an attachment embodying the invention;

Figure 2 is a front view of the attachment showing in detail the manner in which the roller on the auxiliary cutter carrying arbor rolls on the upper surface of the contour guide plate on the fixture of the machine in connection with feed of the bed plate and controls the cutter on the auxiliary arbor so that it forms or mills on the work piece an upper surface having the same contour as the upper surface of the guide plate;

Figure 3 is a side view of the attachment illustrating in detail the construction and manner of mounting of the vertically swinging frame in which the auxiliary cutter carrying arbor is journaled;

Figure 5:
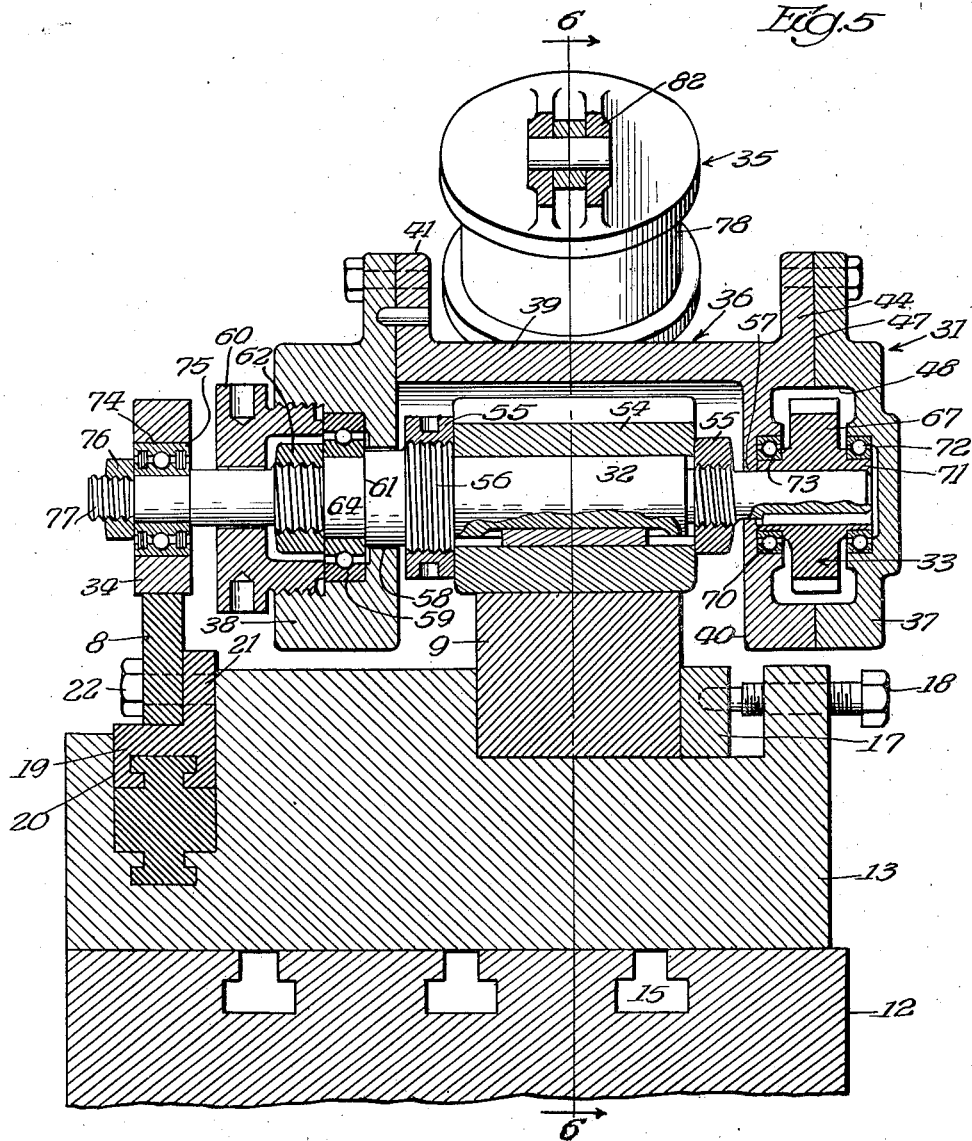
Figure 6:
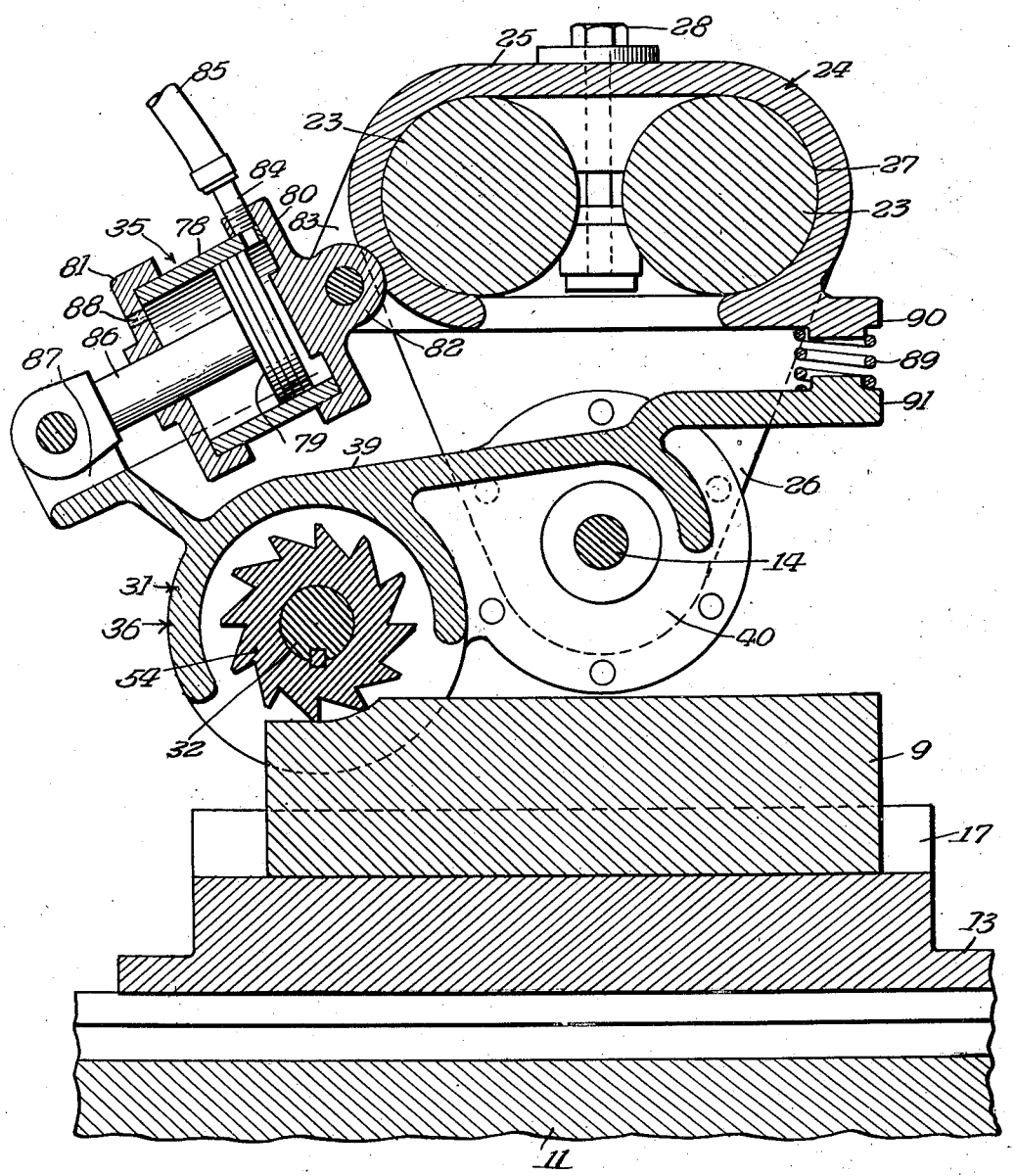

Figure 5 is an enlarged vertical section taken on the line 5—5 of Figure 2 and illustrating the manner in which the roller equipped auxiliary arbor is mounted with respect to the vertically swinging frame; and Figure 6 is a vertical section taken on the line 6—6 of Figure 5 and showing the manner in which the frame serves to house or cover the upper portion of the cutter on the auxiliary arbor, and in addition the construction and design of the pneumatic actuator which serves in connection with the use of the attachment to urge the roller on the auxiliary arbor into contact with the upper face of the contour guide plate.

The attachment which is shown in the drawings constitutes the preferred form or embodiment of the invention. It is designed for use in connection with a milling machine 7 and serves in conjunction with a contour guide plate 8 to mill the upper surface of a work piece 9 so that it corresponds in contour to the upper surface of the guide plate 8. The milling machine 7 is of conventional or standard design and comprises a housing structure 10, a table 11 in front of the housing structure 10, a bed plate 12 on the table, a fixture 13 on the bed plate and an arbor 14 over the table 11. The table of the milling machine 7 is connected to and projects forwards from the front central portion of the housing structure 10 and extends horizontally. The bed plate 12 is mounted on the top face of the table so that it is capable of sliding horizontally and rectilinearly, and in connection with use of the milling machine is fed by power mechanism (not shown) in the housing structure 10. The fixture 13 rests on the top face of the bed plate 12 and is connected to the latter by bolt and T-slot connections 15 in order that it may be adjusted horizontally relatively to the bed plate. The rear upper portion of the fixture 13 is provided with a horizontally extending groove 16. This groove is disposed in parallel relation with the path or course of movement of the bed plate 12 and is adapted to have seated therein the work piece 9. A bar 17 together with cap screws 18 serves to clamp the work piece 9 in the groove 16. A mounting bar 19 is adjustably mounted in a horizontally extending groove 20 in the front upper portion of the fixture 13 and embodies an upstanding flange 21 to which the lower portion of the contour guide plate 8 is detachably connected by way of bolts 22. The groove 20 is disposed in parallel relation with the groove 16 in order that the guide plate 8 is maintained in parallel relation with the work piece 9. As hereinafter described, the contour of the upper surface of the guide plate 8 determines the contour of the surface that is milled by the attachment. When it is desired to effect a change in the milled contour of the upper surface of another work piece the contour guide plate 8 is removed or detached by withdrawing the bolts 22 and is then replaced by a second guide plate (not shown), the upper surface of which has the desired contour for the upper surface of the different work piece. The arbor 14 of the milling machine 7 projects forwards from the upper portion of the housing structure 10 and extends at right angles to the path of movement of the fixture equipped bed plate 12. It is disposed in a horizontal plane and, as well understood in the art, is driven by power mechanism in the housing structure so that it revolves at the same time the bed plate 12 is fed. A pair of horizontally extending laterally spaced arms 23 and an inverted U-shaped bracket 24 serve to support the front or exteriorly disposed end of the arbor 14. The arms 23 are disposed above and in parallel relation with the arbor and have the inner ends thereof fixedly secured to the upper portion of the housing structure 10. The bracket 24 is in the form of a one piece casting and consists of a cross wall 25 and a pair of depending end walls 26. The upper portions of the end walls of the brackets are provided with pairs of aligned holes 27 through which the arms 23 extend. Draw bolts 28 extend through the cross wall 25 and serve releasably to connect the bracket 24 to the arms 23. The lower portions of the bracket end walls are provided with aligned or coaxial holes 29 and these surround the adjacent portions of the exteriorly disposed end of the arbor 14. Such portions of the arbor are journaled in a pair of roller bearings 30 the outer races of which are suitably secured within the portions of the bracket end walls 26 that define the holes 29. When the milling machine 7 is used without the attachment a cutter (not shown) is mounted on, and keyed to, the portion of the arbor 14 that is disposed between the end walls of the inverted U-shaped bracket 24. When the attachment is in use it is contemplated that the aforesaid cutter will be removed from the arbor 14. Removal of the cutter is effected by loosening the draw bolts 28 and then sliding the bracket 24 and cutter forwards.

As its principal parts or components the attachment comprises a frame 31, an auxiliary arbor 32, a gear train 33, a roller 34, and a pneumatic actuator 35.

Figure 1:
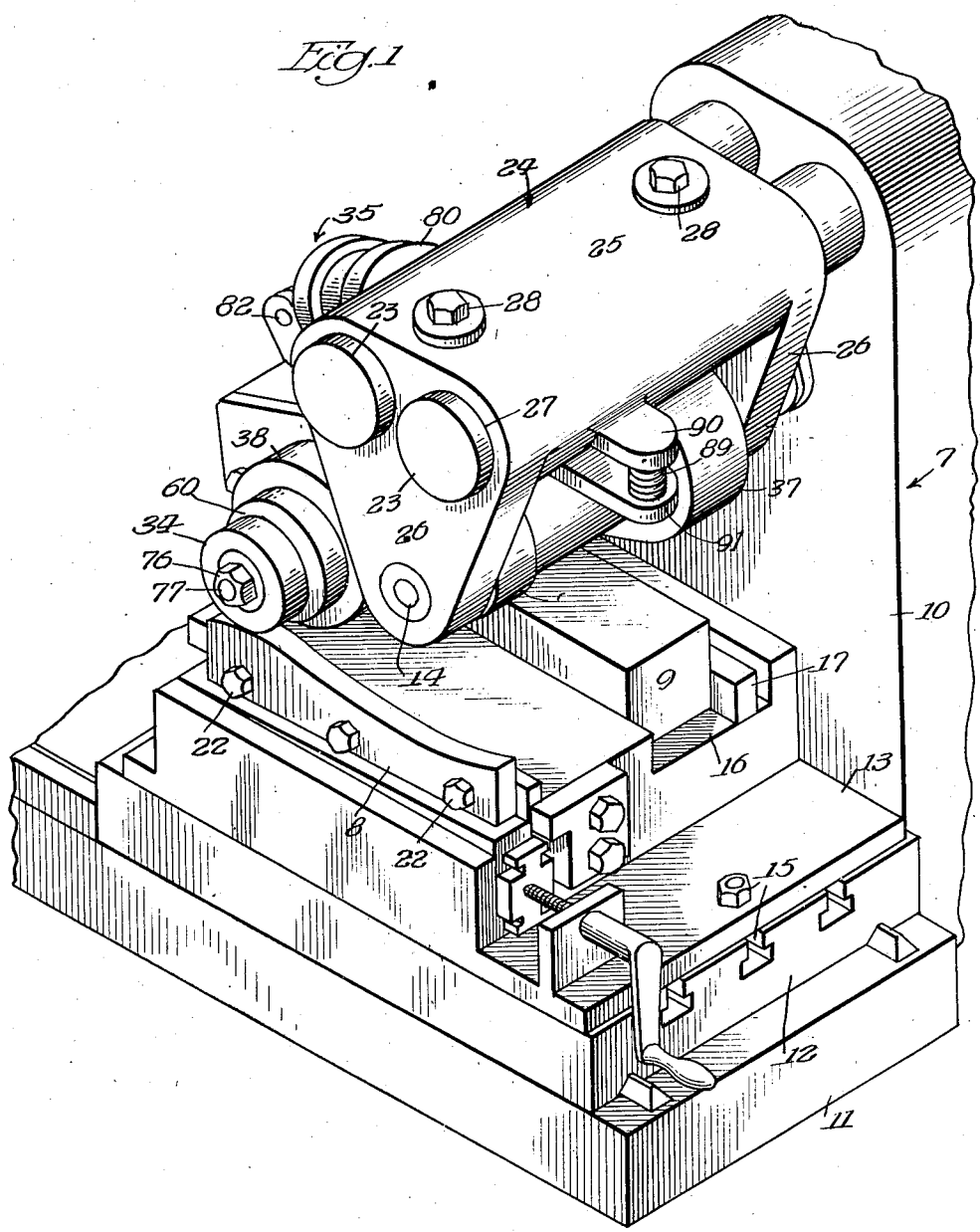
Figure 4:
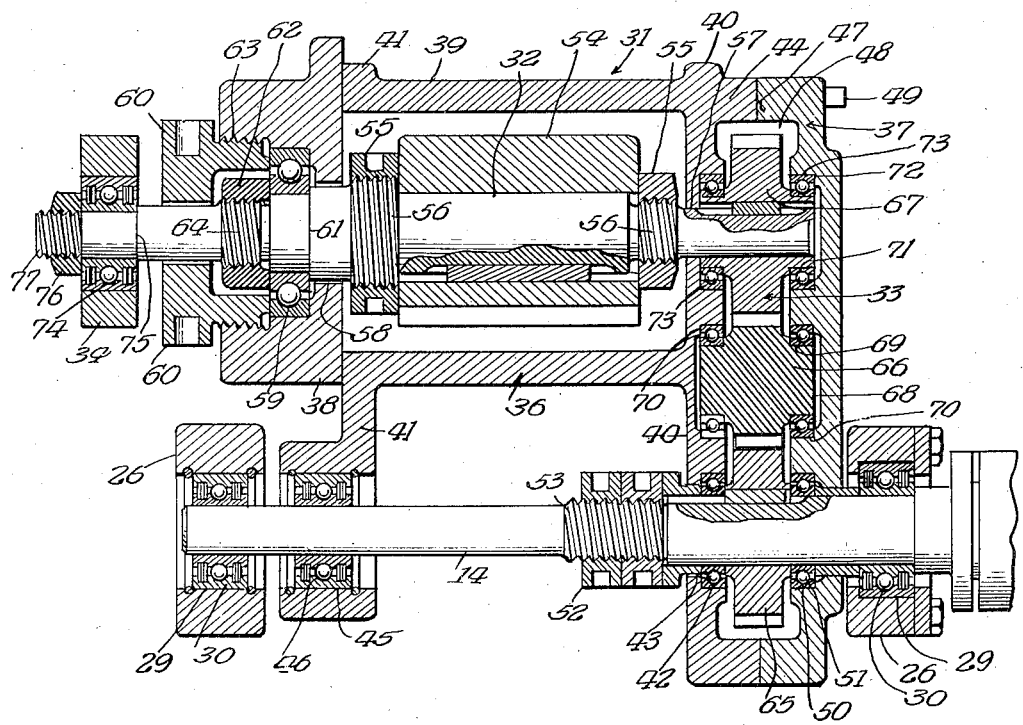
Figure 4 is an enlarged horizontal section taken on the line 4—4 of Figure 2 and showing the construction and arrangement of the gear train for driving the auxiliary arbor from the main arbor of the milling machine, and in addition the manner in which the frame of the attachment is pivotally supported so that it is capable of swinging vertically.

The frame 31 is located for the most part at one side of the main arbor 14 and preferably is in the form of a composite casting. It serves to support the auxiliary arbor 32 in parallel relation with the main arbor 14, permits the auxiliary arbor to swing bodily upwards and downwards, and consists of an intermediate part 36, an inner end part 37, and an outer end part 38. The intermediate part 36 consists of a hollow horizontally extending semi-cylindrical intermediate wall 39, an elongated inner end wall 40 and an elongated outer end wall 41. The semi-cylindrical intermediate wall 39 is disposed adjacent to and in parallel relation with the central portion of the front or exteriorly disposed end of the main arbor 14 and is arranged so that the side margins thereof face downwards. One end of the elongated inner end wall 40 of the intermediate part 36 of the frame extends across and is formed integrally with the inner end of the semi-cylindrical intermediate wall 39, and the other end of said end wall projects in the direction of the main arbor 14 and has a circular hole 42 through which the main arbor extends, as best shown in Figure 4 of the drawings. A ball bearing 43 is disposed within the hole 42. The outer race of this bearing fits snugly within the portion of the inner end wall 40 that defines the hole 42 and the inner race is keyed or otherwise fixedly secured to the adjacent portion of the main arbor 14. Said inner end wall 40 of the intermediate part 36 of the frame 31 is provided with an inwardly or rearwardly extending marginal flange 44. The other end wall of the intermediate part 36, that is, the outer end wall 41 has one end thereof formed integrally with the outer or front end of the semi-cylindrical intermediate wall 39. The other end of the outer end wall 41 projects in the direction of the arbor 14, is disposed directly inwards of the outer end wall of the inverted U-shaped bracket 24, and embodies a circular hole 45 through which the main arbor 14 extends. A ball bearing 46 is disposed within the hole 45. The outer race of the last mentioned ball bearing is suitably secured within the portion of the end wall 41 that defines the hole 45, and the inner race of the ball bearing 46 extends around and is fixed to the adjacent portion of the arbor 14. The inner end part 37 of the frame 31 is disposed directly rearwards of, and is shaped conformably to, the inner end wall 40 of the intermediate part 36 of the frame 31. It embodies an integral forwardly extending marginal flange 47 and this abuts against the flange 44 and coacts with the latter so to space the inner end part 37 from the inner end wall 40 as to form a compartment 48 therebetween. Cap screws 49 extend through registering screw threaded holes in the flanges 47 and 44 and serve removably to connect the inner end part 37 of the frame 31 to the intermediate part 36. The portion of the inner end part 37 that is disposed opposite the outer end of the inner end wall 40 of the intermediate part of the frame is provided with a circular hole 50 through which extends the main arbor 14. A ball bearing 51 fits within the hole 50. The outer race of this ball bearing fits snugly within the portion of the inner end part 37 that defines the hole 51 and the inner race of the ball bearing 51 is keyed or otherwise fixedly secured to the adjacent portion of the main arbor 14. The ball bearings 43, 46 and 51 permit the frame 31 of the attachment to swing upwards and downwards while at the same time permitting the main arbor 14 to rotate or revolve relatively to the frame. The frame is held against axial displacement with respect to the main arbor 14 by way of a pair of nuts 52. The latter extend around, and interfit with, a screw thread 53 on the central portion of the outer or exteriorly disposed end of the main arbor 14 and are located adjacent the outer end of the inner end wall 40 of the intermediate part of the frame. The outer end part 38 of the frame 31 extends across and is bolted to the inner end of the outer end wall 41 of the intermediate part 36.

The auxiliary arbor 32 extends through and is supported by the distal portion of the frame 31. The central portion of the auxiliary arbor is disposed centrally within the semi-cylindrical intermediate wall 39 of the intermediate part of the frame and is provided with a sleeve-like cutter 54. The latter is keyed or splined to the central portion of the auxiliary arbor by way of a pair of nuts 55. The latter abut against the ends of the cutter 54 and surround, and interfit with, screw threads 56 on the adjacent portions of the auxiliary arbor. The semi-cylindrical intermediate wall 39 of the intermediate part of the frame extends around and serves to encase or cover the upper portion of the cutter 54. When the attachment is in use the cutter 54 engages and serves to mill the upper surface of the work piece 9. The inner or rear end of the auxiliary arbor 32 extends through a hole 57 in the inner end of the inner end wall 40 of the intermediate part of the frame and projects across the compartment 48 as shown in Figure 4. The outer or front end of the auxiliary arbor extends through a hole 58 in the central portion of the outer end part 38 of the frame 31 and projects therebeyond. It is journaled in a ball bearing 59, the outer race of which is secured in place by a collar-like retainer 60 and the inner race of which is clamped against an annular shoulder 61 on the adjacent portion of the auxiliary arbor by a nut 62. The collar-like retainer 60 surrounds the nut 62 and is connected to the outer end of the outer end part 38 of the frame by a screw thread connection 63. The nut 62 surrounds, and interfits with, a screw thread 64 on the adjacent portion of the auxiliary arbor.

The gear train 33 serves in connection with the use of the attachment to drive the auxiliary arbor 32 from the main arbor 14. It is disposed in the compartment 48 and comprises a pinion 65 on the main arbor, an idler pinion 66, and a pinion 67 on the inner end of the auxiliary arbor. The pinion 65 fits between the ball bearings 43 and 51 and is keyed to the adjacent portion of the main arbor 14. The idler pinion 66 meshes with, and is driven by, the pinion 65. It is disposed in the central portion of the compartment 48 and embodies an elongated hub 68, the ends of which are journaled in a pair of ball bearings 69. The outer races of the last mentioned bearings fit within circular grooves 70 in the central portions of the outer end wall 40 and the inner end part 37 of the frame. The pinion 67 meshes with, and is driven by, the idler pinion 66. It is keyed to the inner or rear end of the auxiliary arbor 32 and embodies an elongated hub 71. The ends of this hub are journaled in a pair of ball bearings 72, the outer races of which fit within circular grooves 73 in the inner end wall 40 and the inner end part 37 of the arbor carrying frame 31. When the main arbor 14 is driven while the attachment is in its operative position the gear train 33 consisting of the pinions 65, 66 and 67 serves to drive the auxiliary arbor 32 together with the cutter 54 in the same direction as the main arbor 14. The pinions 65 and 67 are the same in diameter with the result that the speed of drive of the auxiliary arbor is the same as that of the main arbor.

The roller 34 is adapted during use of the attachment to ride on the upper surface of the detachable contour guide plate 8 on the fixture 13 and is rotatably mounted on the outer or front end of the auxiliary arbor 32 by way of a ball bearing 74. The outer race of this bearing is connected by a press or drive fit to the inner periphery of the roller and the inner race of the bearing is clamped against an annular shoulder 75 on the outer end of the auxiliary arbor by way of a nut 76. The latter surrounds, and interfits with, a reduced externally threaded stem 77 on the outer end of the auxiliary arbor. During use of the attachment the roller 34 rides on the guide plate 8 and so coacts with the upper surface of the latter as to cause the cutter 54 to mill the work piece 9 in such manner that the upper surface thereof has the same contour as the upper surface of the guide plate 8. Such guide plate essentially functions as a template for determining the contour of the surface which is milled by the cutter 54 on the auxiliary arbor 32 of the attachment. The diameter of the roller 34 is the same as the diameter of the cutter 54.

The pneumatic actuator 35 serves when energized or actuated to urge the frame 31 downwards in order to cause the roller 34 to bear against the guide plate 8. It extends between the inverted U-shaped bracket 24 of the milling machine 7 and the intermediate part 36 of the frame 31 and comprises a cylinder 78 and a piston 79. The cylinder is disposed at an angle of approximately 45 degrees with respect to the horizontal and embodies an upper head 80 and a lower head 81. The upper head 80 is provided with a pair of laterally spaced ears 82 and these straddle and are pivotally connected to a laterally extending lug 83 on the cross wall 25 of the U-shaped bracket 24 in order that the actuator as a whole is free to swing vertically. A fitting 84 is connected to the upper head 80 and is adapted to introduce air under pressure into the upper end of the cylinder. The fitting is connected to any suitable source of air under pressure by way of a valve equipped flexible conduit 85. The piston 79 is mounted in the cylinder to slide back and forth between heads 80 and 81 and embodies a downwardly extending piston rod 86. The latter extends slidably through a stuffing box in the central portion of the lower head 81 and has the outer end thereof disposed between, and pivotally connected to, a pair of laterally spaced upstanding ears 87 on the central portion of the semi-cylindrical intermediate wall 39 of the intermediate part of the frame 31. When air under pressure is introduced into the upper end of the cylinder by way of the fitting 81 the piston slides in the direction of the lower head 81 and operates through the medium of the piston rod 86 to swing the frame 31 downwards. A vent opening 88 is formed in the lower head 81 of the cylinder. When the actuator is energized it operates yieldingly to urge the frame downwards. A vertically extending spiral compression spring 89 operates to retract or shift upwards the frame 31 when the supply of air under pressure to the cylinder of the actuator is shut off. This spring, as shown in the drawings, is located on the opposite side of the main arbor 14. The upper end of the spring 89 abuts against a laterally projecting lug 90 on the cross wall 25 of the inverted U-shaped bracket 24 and the lower end of the spring abuts against the outer end of an arm 91 which extends transversely over the main arbor 14 and is connected to the semi-cylindrical intermediate wall 39 of the intermediate part of the frame 31.

When it is desired to use the attachment the work piece 9 is clamped in the groove 16 in the fixture 13 and the desired contour guide plate is bolted to the upstanding flange 21 on the mount 19. As soon as the guide plate is bolted into place the milling machine is started so as to effect feed of the bed plate 12 and drive the auxiliary arbor. After starting the milling machine the pneumatic actuator 35 is energized so as to swing the frame 31 downwards and cause the cutter 54 to engage and effect milling of the work piece. In connection with feed of the bed plate the roller 34 on the outer or front end of the auxiliary arbor coacts with the upper surface of the guide plate in such manner as to cause the cutter to provide the upper surface of the work piece with an irregular contour corresponding to that of the upper surface of the guide plate. After complete milling of the work piece 9 the supply of air under pressure to the pneumatic actuator 35 is cut off. As soon as the actuator is rendered ineffective the compression spring 89 between the lug 90 and the arm 91 retracts or swings upwards the frame 31 and thus disengages the cutter 54 from the work piece and the roller 34 from the guide plate.

The herein described milling machine attachment is simple in design and effectively and efficiently fulfills its intended purpose. It may be produced at a comparatively low cost and is characterized by the fact that it may be readily removed from the milling machine when it is desired regularly to use the latter.

The invention is not to be understood as restricted to the details set forth since these may be modified within the scope of the appended claims without departing from the spirit and the scope of the invention.

Having thus described the invention what I claim as new and desire to secure by Letters Patent is:

1. In combination with a milling machine embodying a horizontally slidable power fed bed plate provided with means for holding a work piece and having a contour guide plate in side by side relation with the holding means, and in addition a rotary power driven arbor positioned over the bed plate and extending transversely of the path of movement of said bed plate, an attachment adapted in conjunction with the guide plate to mill the work piece to a contour corresponding to that of the guide plate and comprising a frame pivoted on the power driven arbor to swing upwards and downwards, an auxiliary arbor disposed in parallel relation with said power driven arbor, mounted rotatably on the distal portion of the frame and provided with a cutter for milling the work piece, a guide element associated with the frame and arranged and adapted in connection with feed of the bed plate to engage the guide plate and cause the auxiliary arbor to swing in conformity with the contour of the guide plate, and means for driving the auxiliary arbor from the power driven arbor.

2. In combination with a milling machine embodying a horizontally slidable power fed bed plate provided with means for holding a work piece and having a contour guide plate in side by side relation with the holding means, and in addition a rotary power driven arbor positioned over the bed plate and extending transversely of the path of movement of said bed plate, an attachment adapted in conjunction with the guide plate to mill the work piece to a contour corresponding to that of the guide plate and comprising a frame pivoted on the power driven arbor to swing upwards and downwards, an auxiliary arbor disposed in parallel relation with said power driven arbor, mounted rotatably on the distal portion of the frame and provided with a cutter for milling the work piece, a roller mounted rotatably on the auxiliary arbor and arranged and adapted in connection with feed of the bed plate to travel on the guide plate and cause the auxiliary arbor to swing in conformity with the contour of the guide plate, and means for driving the auxiliary arbor from the power driven arbor.

3. In combination with a milling machine embodying a horizontally slidable power fed bed plate provided with means for holding a work piece and having a contour guide plate in side by side relation with the holding means, and in addition a rotary power driven arbor positioned over the bed plate and extending transversely of the path of movement of said bed plate, an attachment adapted in conjunction with the guide plate to mill the work piece to a contour corresponding to that of the guide plate and comprising a frame pivoted on the power driven arbor to swing upwards and downwards, an auxiliary arbor disposed in parallel relation with said power driven arbor, mounted rotatably on the distal portion of the frame and provided with a cutter for milling the work piece, a roller associated with the frame and arranged and adapted in connection with feed of the bed plate to travel on the guide plate and cause the auxiliary arbor to swing in conformity with the contour of the guide plate, and gearing between the power driven arbor from the auxiliary arbor for driving the latter from the former.

4. In combination with a milling machine embodying a horizontally slidable power fed bed plate provided with means for holding a work piece and having a contour guide plate in side by side relation with the holding means, and in addition a rotary power driven arbor positioned over the bed plate and extending transversely of the path of movement of said bed plate, an attachment adapted in conjunction with the guide plate to mill the work piece to a contour corresponding to that of the guide plate and comprising a frame pivoted on the power driven arbor to swing upwards and downwards and provided with a closed compartment, an auxiliary arbor disposed in parallel relation with said power driven arbor, mounted rotatably on the distal portion of the frame and provided with a cutter for milling the work piece, a roller associated with the frame and arranged and adapted in connection with feed of the bed plate to travel on the guide plate and cause the frame to swing in conformity with the contour of the guide plate, and gearing in the compartment for driving the auxiliary arbor from the power driven arbor.

5. In combination with a milling machine embodying a horizontally slidable power fed bed plate provided with means for holding a work piece and having a contour guide plate in side by side relation with the holding means, an attachment adapted in conjunction with the guide plate to mill the work piece to a contour corresponding to that of the guide plate and comprising a frame pivoted to swing upwards and downwards, and provided at the distal portion thereof with a downwardly facing semi-cylindrical hollow wall extending transversely to the path of travel of the bed plate, a horizontal auxiliary arbor mounted rotatably on said distal portion of the frame having a portion thereof disposed in coaxial relation with the axis of said wall, and provided on said portion with a cutter for milling the work piece, a guide element mounted on the auxiliary arbor and arranged and adapted in connection with feed of the bed plate to engage the guide plate and cause said auxiliary arbor to swing in conformity with the contour of the guide plate, and means for driving said auxiliary arbor.

6. In combination with a milling machine embodying a horizontally slidable power fed bed plate provided with means for holding a work piece and having a contour guide plate in side by side relation with the holding means, and in addition a rotary power driven arbor positioned over the bed plate and extending transversely of the path of movement of said bed plate, an attachment adapted in conjunction with the guide plate to mill the work piece to a contour corresponding to that of the guide plate and comprising a frame, having a closed compartment, pivoted on the power driven arbor to swing upwards and downwards, and provided at the distal portion thereof with a downwardly facing semi-cylindrical hollow wall extending transversely to the path of travel of the bed plate, a horizontally extending auxiliary arbor mounted rotatably on said distal portion of the frame having a portion disposed in coaxial relation with the axis of said wall, and provided on said portion with a cutter for milling the work piece, a guide element associated with the frame and arranged and adapted in connection with feed of the bed plate to engage on the guide plate and cause the auxiliary arbor to swing in conformity with the contour of the guide plate, and gearing in the compartment for driving the auxiliary arbor from the power driven arbor.

7. In combination with a milling machine embodying a horizontally slidable power fed bed plate provided with means for holding a work piece and having a contour guide plate in side by side relation with the holding means, and in addition a rotary power driven arbor positioned over the bed plate and extending transversely of the path of movement of said bed plate, an attachment adapted in conjunction with the guide plate to mill the work piece to a contour corresponding to that of the guide plate and comprising a frame pivoted on the power driven arbor to swing upwards and downwards, an auxiliary arbor disposed in parallel relation with said power driven arbor, mounted rotatably on the distal portion of the frame and provided with a cutter for milling the work piece, a guide element associated with the frame and arranged and adapted in connection with feed of the bed plate to engage the guide plate and cause the auxiliary arbor to swing in conformity with the contour of the guide plate, means for driving the auxiliary arbor from the power driven arbor and means for urging the frame downwards.

8. In combination with a milling machine embodying a horizontally slidable power fed bed plate provided with means for holding a work piece and having a contour guide plate in side by side relation with the holding means, and in addition a rotary power driven arbor positioned over the bed plate and extending transversely of the path of movement of said bed plate, an attachment adapted in conjunction with the guide plate to mill the work piece to a contour corresponding to that of the guide plate and comprising a frame pivoted on the power driven arbor to swing upwards and downwards, an auxiliary arbor disposed in parallel relation with said power driven arbor, mounted rotatably on the distal portion of the frame and provided with a cutter for milling the work piece, a roller mounted rotatably on the auxiliary arbor and arranged and adapted in connection with feed of the bed plate to travel on the guide plate and cause the auxiliary arbor to swing in conformity with the contour of the guide plate, means for driving the auxiliary arbor from the power driven arbor, and means for urging the frame downwards.

JAMES G. PATTON.

REFERENCES CITED

The following references are of record in the file of this patent:

UNITED STATES PATENTS

| Number | Name | Date |
|---|---|---|
| 803,137 | Salmon | Oct. 31, 1905 |
| 2,183,689 | Olson | Dec. 19, 1939 |
| 2,345,494 | Onsrud | Mar. 28, 1944 |